(12) United States Patent
Lentz (10) Patent No.: US 8,076,607 B2
(45) Date of Patent: Dec. 13, 2011

(54) METHOD AND APPARATUS FOR DEPOSITING RAISED FEATURES AT SELECT LOCATIONS ON A SUBSTRATE TO PRODUCE A SLIP-RESISTANT SURFACE

(75) Inventor: James Lentz, Phoenixville, PA (US)

(73) Assignee: Ross Technology Corporation, Leola, PA (US)

( * ) Notice: Subject to any disclaimer, the term of this patent is extended or adjusted under 35 U.S.C. 154(b) by 1077 days.

(21) Appl. No.: 11/768,980

(22) Filed: Jun. 27, 2007

(65) Prior Publication Data

US 2009/0001058 A1 Jan. 1, 2009

(51) Int. Cl.
*B23K 26/38* (2006.01)

(52) U.S. Cl. .................................. 219/121.64

(58) Field of Classification Search ............... 219/121.6, 219/121.61, 121.63, 121.64, 121.8, 121.84, 219/121.85; 427/555, 556, 596
See application file for complete search history.

(56) References Cited

U.S. PATENT DOCUMENTS

| | | | |
|---|---|---|---|
| 4,200,669 A * | 4/1980 | Schaefer et al. ............. | 427/596 |
| 4,281,030 A | 7/1981 | Silfvast | |
| 4,299,860 A * | 11/1981 | Schaefer et al. ............. | 427/556 |
| 4,300,474 A | 11/1981 | Livsey | |
| 4,488,882 A | 12/1984 | Dausinger et al. | |
| 4,496,607 A | 1/1985 | Mathias | |
| 4,536,639 A * | 8/1985 | Crahay ..................... | 219/121.78 |
| 4,644,127 A | 2/1987 | La Rocca | |
| 4,724,299 A | 2/1988 | Hammeke | |
| 4,743,733 A | 5/1988 | Mehta et al. | |
| 4,814,575 A | 3/1989 | Petitbon | |
| 4,818,562 A | 4/1989 | Arcella et al. | |
| 5,208,431 A | 5/1993 | Uchiyama et al. | |
| 5,245,155 A * | 9/1993 | Pratt et al. ................ | 219/121.63 |
| 5,368,947 A * | 11/1994 | Denney ..................... | 428/553 |
| 5,449,536 A * | 9/1995 | Funkhouser et al. .... | 219/121.85 |
| 5,612,099 A * | 3/1997 | Thaler ....................... | 427/555 |
| 5,620,552 A | 4/1997 | Denney | |
| 5,719,372 A * | 2/1998 | Togari et al. ............. | 219/121.61 |
| 5,912,057 A | 6/1999 | Nishimura et al. | |
| 6,122,564 A * | 9/2000 | Koch et al. .................. | 700/166 |
| 6,344,246 B1 | 2/2002 | Fischer et al. | |
| 6,495,793 B2 * | 12/2002 | Tewari ...................... | 219/121.64 |
| 6,504,127 B1 * | 1/2003 | McGregor et al. ........ | 219/121.63 |
| 6,526,327 B2 * | 2/2003 | Kar et al. ................... | 219/121.6 |
| 6,756,561 B2 * | 6/2004 | McGregor et al. ........ | 219/121.64 |
| 7,001,672 B2 | 2/2006 | Justin et al. | |
| 7,125,599 B2 | 10/2006 | Saldarelli et al. | |
| 2002/0018908 A1 | 2/2002 | Smith et al. | |
| 2004/0133298 A1* | 7/2004 | Toyserkani et al. ....... | 219/121.61 |
| 2004/0212659 A1* | 10/2004 | Buchanan et al. ........ | 219/121.64 |
| 2004/0251242 A1* | 12/2004 | Suh .......................... | 219/121.63 |
| 2005/0123672 A1* | 6/2005 | Justin et al. ................. | 427/2.26 |
| 2005/0178750 A1* | 8/2005 | Cheng et al. ............. | 219/121.64 |

\* cited by examiner

*Primary Examiner* — Geoffrey S Evans
(74) *Attorney, Agent, or Firm* — Andrew D. Mead (57) ABSTRACT

An improved apparatus and method for applying a plurality of raised features at select locations on a metallic substrate using a high-powered radiant energy source, such as a laser, in combination with powder metallurgy such that the resultant substrate surface exhibits increased slip-resistance resulting from the presence of the raised features on the substrate.

13 Claims, 4 Drawing Sheets

METHOD AND APPARATUS FOR DEPOSITING RAISED FEATURES AT SELECT LOCATIONS ON A SUBSTRATE TO PRODUCE A SLIP-RESISTANT SURFACE

BACKGROUND OF THE INVENTION

The present invention is directed to the production of non-skid or slip-resistant material and more particularly to a method of producing a slip-resistant substrate by deposition of raised features of a compatible or dissimilar materials at select locations on the substrate surface by using a high power radiant energy source, such as a laser, an electron beam, plasma transfer arc, infrared lamps and the like, and a substrate including the same thereon.

In certain industrial settings there are many locations that are difficult or even hazardous for personnel and/or motorized vehicles to move across due to materials that may coat the floor. Such materials include water mud, snow, blood, inks, oil, chemicals, and other slippery substances. If no precautions are taken, slips and falls may occur to personnel that can lead to costly injuries.

In order to reduce the chances of slips and falls, many propose to alter the surfaces to increase traction (or the coefficient of friction) in areas where accidents are most likely to occur. There are a number of known methods to alter the surface characteristics to increase the traction including using stamped or rolled materials, flame sprayed aluminum coatings, hot rolled materials, and grit bearing paints or tapes. All of these materials increase traction by populating the surface with aspirates which increase the frictional forces.

However, the presently available non-skid materials all have some negative aspects. Rolled materials, such as diamond plate, do not increase the frictional forces substantially because of the large size of the features that are rolled into the material. Stamped materials, that is materials that are cut and bent, have very high frictional forces but must be formed out of thin materials which cannot withstand high loadings (such as with motorized material handlers) and must be formed and joined to the area that is to be covered. Flame sprayed aluminum, paints, abrasives, and tapes often flake or wear-off, especially under high loads. The use of hot rolled fabricated (carbon steel) materials is limited since they cannot be formed extensively.

Further, as noted above, conventional methods for making non-skid materials include hot-rolling of particles into a surface, hot-rolling of roughing patterns into the surface, and flame-spraying of a material onto the surface, such as aluminum. The rolling of particles or patterns for producing the non-skid effect requires that the final structure be cut from a large plate. If the plate requires further fabrication, however, such as bending, cutting, and/or shaping, it may result in a loss of the non-skid characteristics of the plate. Moreover, the rolling of particles and flame-spraying techniques do not result in true metallurgical bonding between the roughing agent (the particles) and the base material substrate. Therefore, this may lead to disengagement of the particles from the surface which can then become trapped in the machinery and adversely affect the non-skid characteristics of the material.

The use of laser or other high energy carrying radiation beams in metallic coating of a metallic substrate for repairing or improving wear resistance, or surface hardening of a metallic article is known and disclosed in U.S. Pat. Nos. 4,299,860 by Schaefer et al.; 4,644,127 by La Rocca; and 4,743,733 by Mehta. The conventional techniques disclosed, however, emphasize smooth coating of substrates, and therefore, cannot be used in fabricating non-skid or slip resistant surfaces of plates, equipment, fixtures, or structures, for application in hazardous areas for personnel protection. The need for such slip-resistant or non-skid surfaces is particularly evident on, for example, the deck plate or launching pad of a naval vessel, such as an aircraft carrier. Due to the adverse and, at times, hostile conditions that are frequently encountered by naval personnel, it becomes critical that the deck surface have a high coefficient of friction to avoid slipping, skidding, or other losses of traction.

U.S. Pat. No. 5,620,552 by Denney addresses some of these limitations by disclosing a method of producing the metallurgically bonded raised bead-like configurations of a compatible material at select locations on the substrate surface. The method includes injecting, substantially simultaneously with projecting a high power radiant energy beam, powder particles into a portion of the beam lying a distance away from the point of impingement on the surface portion of the article. The particles interact with the beam for a time period sufficient to cause at least partial melting of a substantial number of particles which are then transported to a selected point on the surface portion. The partially melted particles, along with completely and/or any substantially unmelted particles, are allowed to bond with the surface material thereby forming a raised configuration thereon. The process is repeated for forming another raised configuration at another selected location on the surface portion and then continually repeated across a desired area to be treated thereby forming a slip-resistant article.

Unfortunately, the Denney process is limited in its utility in that the raised configurations have a limited depth of penetration in the bond with the substrate which limits their strength. Furthermore, the process for positioning the supply of powder particles to the selected point requires highly coordinated control of the powder feed and plasma suppression gases for the process to create the raised configurations. As a result, the speed at which the process can be successfully performed is limited to about 50 linear inches per minute. For economic and commercial success speeds substantially in excess of 200 inches per minute are required.

It would be a great advantage to provide an apparatus and an improved method for depositing raised features at select locations on a metallic substrate to create a slip-resistant surface that overcomes the above problems and disadvantages.

SUMMARY OF THE INVENTION

Accordingly, it is an object of the present invention is to provide an improved method of producing a non-skid, anti-slip, slip-resistant or non-slip surface on a substrate material.

It is a further object of the present invention to provide a method which can be used to produce a slip-resistant surface on a near finished substrate surface.

It is a further object of the present invention to provide a method wherein the roughing agent (metallic powder or powder blend) forms a true metallurgical bond with the substrate material and does not tend to be easily dislodged from the substrate.

It is a further object of the present invention to provide a method wherein metallurgically bonded, bead-like, raised protrusions are obtained.

It is a further object of the present invention to provide a method which allows shaping or forming of parts, articles, substrates, or the like after the non-skid material (roughing agent) has been applied to the part forming the base material.

It is a further object of the present invention to provide a method which can be used to make non-skid surface on a wide variety of metallic materials, for example, but not limited to, carbon steel, stainless steel, aluminum, nickel, copper, and titanium alloys.

It is a still further object of the present invention to provide a method that can be used to pattern a non-skid surface on a base substrate material to maximize the coefficient of friction in a specific direction or to clad only selected areas of a much larger surface without applying the pattern to the entire structure, or adding an additional plate with the non-skid material.

It is a still further object of the present invention to provide a method that relies on pulse width, frequency, and travel speed of a high power radiant energy source to create raised protrusions on a substrate instead of relying on precision control of the roughing agent supply and the relative motion between the substrate and the energy source.

It is a still further object of the present invention to provide an improved method of producing a non-skid, anti-slip, slip-resistant or non-slip surface on a substrate material that permits substantially higher application rates than previously known, generally on the order of five to twenty-five times greater than the application rates presently known.

It is a still further object of the present invention to provide a method of producing a slip-resistant surface on generally planar and non-planar surfaces alike.

It is a still further object of the present invention to provide an improved method for producing a non-skid, anti-slip, slip-resistant or non-slip surface on a substrate material that results in a non-skid surface that is durable in construction, inexpensive of manufactures and carefree of maintenance using a process that is simple and effective to use.

These and other objects are achieved by providing an improved apparatus and method for applying a plurality of raised features at select locations on a metallic substrate using a high-powered radiant energy source in combination with powder metallurgy such that the resultant substrate surface exhibit increased slip-resistance.

BRIEF DESCRIPTION OF THE DRAWINGS

The advantages of this invention will be apparent upon consideration of the following detailed disclosure of the inventions especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

The goal in developing the process of this present invention for depositing a material on a metallic substrate in a manner to create a non-skid surface was to develop an application method that deposits a sufficient amount of powder material at specific locations on a substrate to create bead-like features that protrude a sufficient distance from the surface to increase the coefficient of friction, even when the surface is coated with a thin liquid film, such as oil. Additionally, the slip-resistant features must be sufficiently bonded with the substrate to prevent their being easily dislodged when subjected to lateral forces such as those occurring which objects are slid across the surface features. Creating bonds with sufficient strength requires a sufficiently powerful energy source, one capable of creating a fusion zone between the slip-resistant features and substrate material that extends further into the substrate than conventional laser-cladding deposition methods. Control of the apparatus must be simplified compared to known methods to enable greater material deposition rates thereby making the process commercially practical.

Figure 1:
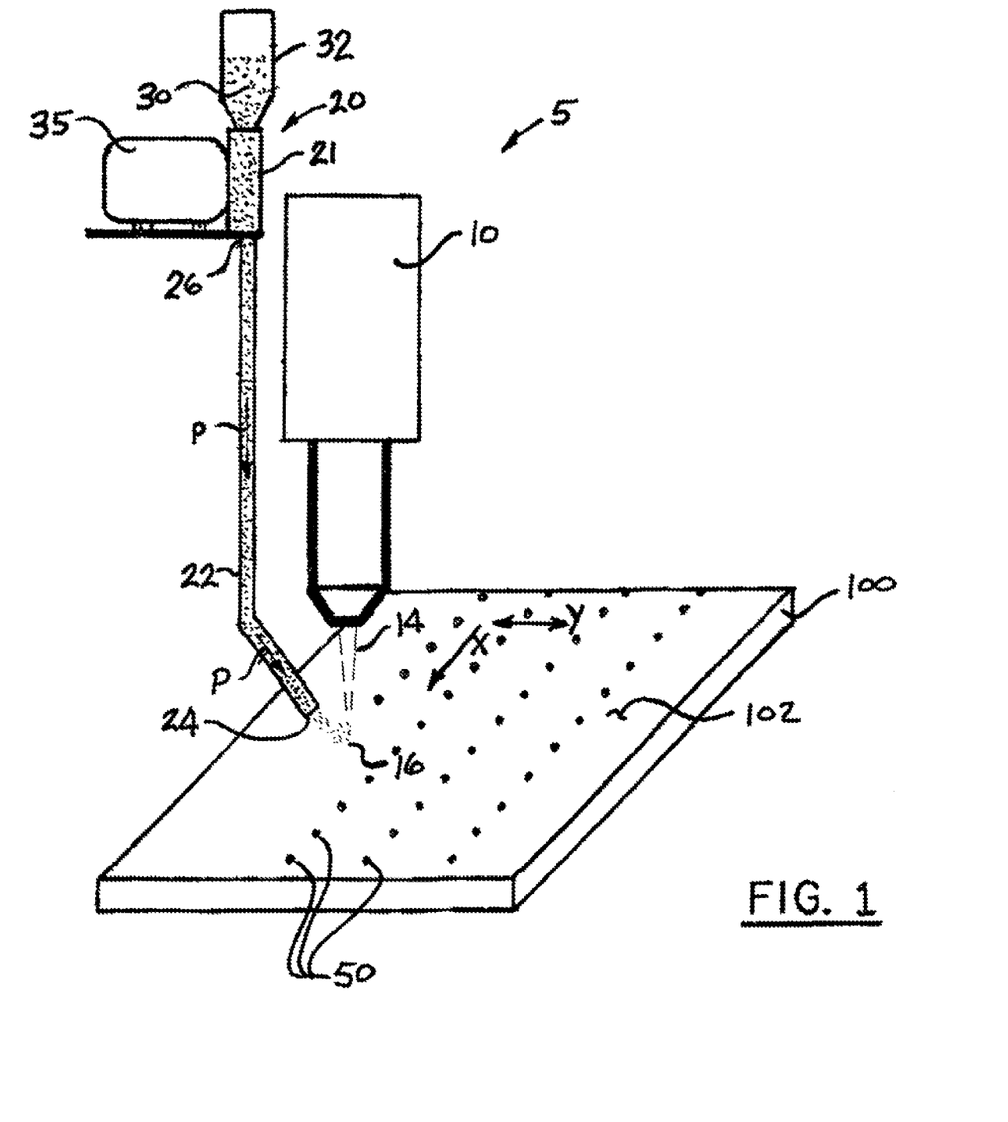
FIG. 1 is a schematic representation of the apparatus for carrying out the present invention.
Figure 2:
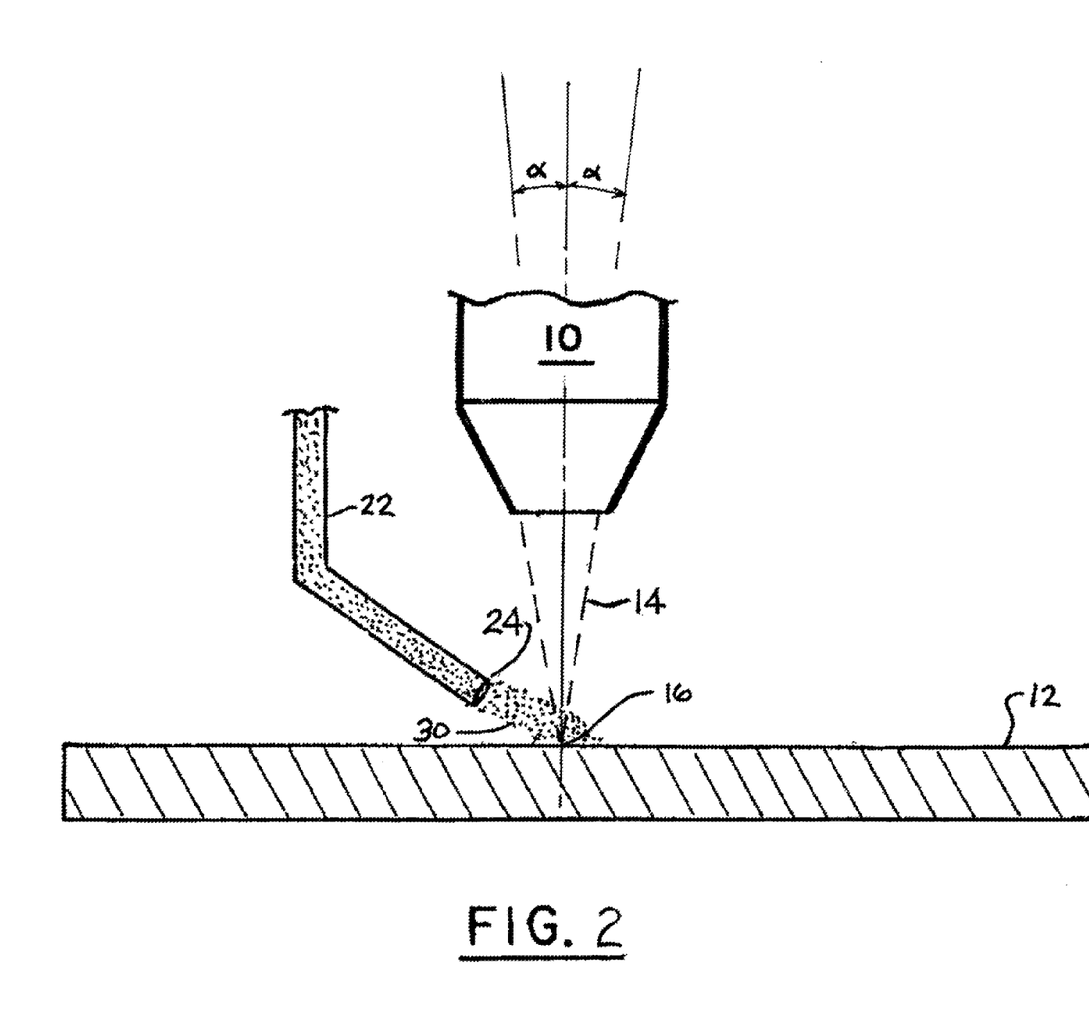
FIG. 2 is a partial enlarged front elevation view of the apparatus shown in FIG. 1 showing the relationship between the beam impingement point, the substrate surface, and the powder injecting nozzle.

First referring to FIGS. 1 and 2, apparatus 5 of the present invention is shown including a high power radiant energy source 10 mounted generally vertically above a work-piece or substrate 100 so that its focused beam 14 is generally perpendicular to the surface 13 of the substrate 12 at the point of impingement. Energy source 10 is preferably positioned so that beam 14 is angled no more than 10 degrees from an axis perpendicular to the substrate surface 13 (illustrated as angle α in FIG. 2). Such variation in energy source position relative to the substrate surface has no adverse affect on the method or the results therefrom. Best performance of the invention is obtained when energy source 10 is positioned vertically above the surface of substrate 12 such that beam 14 is projected downwardly.

The radiation source 10 which may be a laser, electron beam, or other infrared source, preferably is mounted on a movable positioning apparatus that allows the beam 14 to be displaced along a direction, shown by arrow "X" in FIG. 1 at a predetermined speed relative to substrate 100 while maintaining the separation between the energy source 10 and the substrate surface 102 generally constant. Radiation source 10 includes a beam adjustment apparatus that enables the beam to be focused on a beam impingement point 16 on the surface 102. Once focused, the movable positioning apparatus maintains the spacing between the source 10 and the surface 102 generally constant so that the beam 14 remains focused on the substrate surface 102. The movable position apparatus may also be capable of moving radiation source 10 in a direction orthogonal to direction "X" as well (shown as arrow "Y"), thereby enabling a two-dimensional pattern of slip-resistant raised features 50 to be applied to the substrate 100. Alternatively, radiation source 10 may be held in a stationary position as the substrate is moved thereby providing the necessary relative motion between source 10 and substrate 100.

A powder feed mechanism 20 is provided generally adjacent to the radiation source 10 for delivering powder material 30 from a supply to the general area surrounding the beam impingement point 16. Powder feed mechanism 20 includes a powder feed tube 22 that has an end portion 24 directed towards the substrate surface 102 proximate to the beam impingement point 16 at an angle of between approximately 25 and 80 degrees from horizontal. The upper end 26 of feed tube 22 is connected to a chamber 21 that receives particle powder 30 from source 32. The powder is gravity fed or otherwise caused to move through powder feed tube 22 into energy beam 14 where it interacts with energy beam 14 and substrate 100 to form a plurality of the desired protruding, bead-like features 50. Other alternatives for causing the powder particles to move through feed tube 22 include mechanical, pneumatic, or other suitable apparatus which will cause the powder particles to be conveyed through the feed tube means in instances when gravity feed cannot be accomplished. The spacing of the protruding features 50 on the surface 102 may be varied to form patterns on the surface for appearance or to alter the coefficient of friction of surface 102. As discussed in greater detail below, the size of the features 50 may also be varied to further alter the friction characteristics of the surface 102.

As best shown in FIG. 2, the powder feed tube 22 is oriented so that the powder particles 30 are directed into the energy beam 14 proximate to the beam impingement point 16. The end portion 24 of powder feed tube 22 may be aligned to feed the powder particles in a direction generally transverse to the travel direction "X" of the energy source 10 relative to substrate 12, from the front of beam 14, pointing opposite to the direction of travel, or from behind the beam 14, pointing in the direction of travel. Although not shown, an appropriate powder monitoring device would be provided in connection with powder feed mechanism 20 in order to make certain that the powder particles 30 are metered into the feed tube 22 at a predetermined rate, balancing the minimum material necessary to achieve the desired slip-resistant protruding features 50 with minimal powder wastage. The minimum powder supply rate is defined as the lowest powder flow rate required to achieve a given feature size for a given energy beam power, pulse width and rate, spot size and travel speed for any given substrate material. For any given set of process parameters, further increases in powder flow rate result in an increase in the feature height and resulting increase in slip resistance, until the powder flow rate reaches a point at which the selected process variables are insufficient to cause a metallurgical bond between the powder particles and the substrate material.

In order to carry out the method of the present invention, the operating parameters of the energy source 10 are selected to yield the desired slip-resistant feature configuration and a focused beam 14 of radiation energy source 10, such as a laser, is projected at a select location on the substrate surface 102. Improving upon the known methods for depositing friction enhancing material on a substrate which require precise control of the energy beam, powder flow rate, powder carrier gas velocity, suppression gas velocity and relative motion between the beam and the substrate, the present invention eliminates the need for both the carrier and suppression gases and the difficulty of their simultaneous control to accurately position the powder stream relative to the position of the energy beam 10. The present invention relies primarily on variation in the energy beam parameters and powder flow rate to control the slip-resistant feature characteristics. These parameters include the beam intermittence (i.e. cyclically pulsing (on/off) of the energy beam with a selectively predefined pulse width and pulse frequency), the relative speed between the energy source and the substrate surface, the composition of the powder material, and the powder feed rate, all of which influence the physical configuration of the resultant features. Precision control of the powder supply is not necessary since a high power energy beam focused at the impingement point on the substrate surface is less susceptible to shadowing by the flow of powder particles to the area. The selected non-skid powder blend particles 30 are injected simultaneously with projecting the energy beam 14 on substrate 12. The particles 30 are carried to a position proximate to the beam impingement point 16 through the feed tube 22 where the beam partially melts both the powder particles and a portion of the substrate material to form a bond between melted powder and the substrate material 12.

Unlike known laser deposition methods which generally rely on relatively low power lasers, e.g. less than about 1,500 watts, the present invention relies on higher power lasers, ranging between about 300 and about 10,000 watts depending on the selected substrate and powder materials. The higher powered energy beam enables the beam to reach the surface of the substrate by transforming powder particles in the beam path to a molten state which is then allowed to commingle with the molten material of the substrate at the impingement point thereby forming a localized fusion zone between the substrate material and the powder particles. The fusion zone extends into the thickness of the substrate beyond that typical of laser-cladding processes and may also encompass alloyed material slightly above the substrate surface. Whereas cladding generally limits material dilution, characterized as change in the powder material composition due to mixing of melted substrate material into the deposit, to less than 10 percent, the present invention relies on some alloying of the deposit substrate materials to form a stronger bond between the feature 50 and the substrate material 12. Cladding processes typically result in a shallow fusion zone depth on the order of 0.001-0.003 inches and therefore form significantly weaker bonds compared to the present method in which the depth of the material fusion zone ranges from 0.006 to 0.035 inches.

In the preferred embodiment, radiation source 10 is a high-power, industrial neodymium-doped yttrium aluminium garnet (YAG) or fiber laser having a power rating ranging between about 300 and about 10,000 watts. The laser may be a pulsed YAG laser, a continuous YAG laser, or fiber laser that is capable of pulsed mode operation, meaning that it is capable of on/off cycles in the range of 5 to 65 milliseconds and that full power is developed in each on/off cycle. The laser should have an output wavelength of $1.07 \times 10^{-6}$ microns or less so that the desired energy is imparted to the substrate and powder particles. Longer wavelengths require greater laser power levels which can quickly exceed the power output capabilities of commercially economical or available lasers. The preferred embodiment of the present invention uses a fiber laser having a wavelength of $1.07 \times 10^{-6}$ microns and a nominal power of approximately 3,000 watts. The radiation source performance requirements exceed the performance offered by the $CO_2$ lasers typically used in similar material deposition applications. Current state of the art $CO_2$ lasers having the required power are limited to continuous lasers; pulsed $CO_2$ lasers having suitable pulse frequencies are generally available only in lower powers (e.g., approximately 500 watts). Furthermore, wavelengths of the $CO_2$ lasers are an order of magnitude longer than either the fiber or YAG lasers ($10.6 \times 10^{-6}$ microns compared to $1.07 \times 10^{-6}$ or $1.063 \times 10^{-6}$ microns). The result is that even greater power input is necessary with a $CO_2$ laser to cause the desired substrate/powder melting. In addition, $CO_2$ lasers are not as efficient in processing highly reflective materials, such as aluminum or aluminum alloys, often requiring 10 times the power to achieve the same results as a YAG or fiber laser. Thus the present invention is capable of producing a slip resistant surface on an aluminum substrate with relatively low (approximately 300-350 watts) laser power, a result not possible with other known processes.

The substrate 12 can be formed of a metallic material, such as iron, carbon, alloy or stainless steel, aluminum, titanium, nickel, copper, and alloys thereof. The powder material 30 for forming the slip-resistant, raised features on the substrate surface 12 can be, but is not limited to low solubility, hard, irregularly shaped particles of nitride, carbide, boride, silicide, oxide, ceramic, aluminide, or mixtures thereof with a metallic metal or powder. The metallic metal or powder being one of, but not limited to, tungsten, stainless steel, carbon steel, aluminum, titanium, nickel, copper, their alloys, or mixtures thereof. The non-skid or powder material can be in the form of a powder, rod, slurry or any other form that allows the non-skid material to reach the point of impingement of energy beam 14 on the substrate surface 12. The powder particle size and size distribution is critical to the final size of the feature 50. For general production, presently available powder blends exhibiting a typical "bell shaped size distribution" with particle sizes ranging from 60 to 200 microns is sufficient to produce acceptable features for most applications. The size of the low solubility additives is slightly larger, generally in the 200 to 300 micron range. Variations in the powder material form may require alternative powder feeding mechanisms suitable for supplying the particular material form at the required rate for the process. It should be noted that the preceding is a non-limiting list of various materials that can be used in the present invention and other materials can also be used in making a substrate or an article with a slip-resistant or non-skid surface provided the selected powder material results in a sufficiently rough or abrasive surface following the bonding process such that the desired surface coefficient of friction is achieved.

Figure 3:
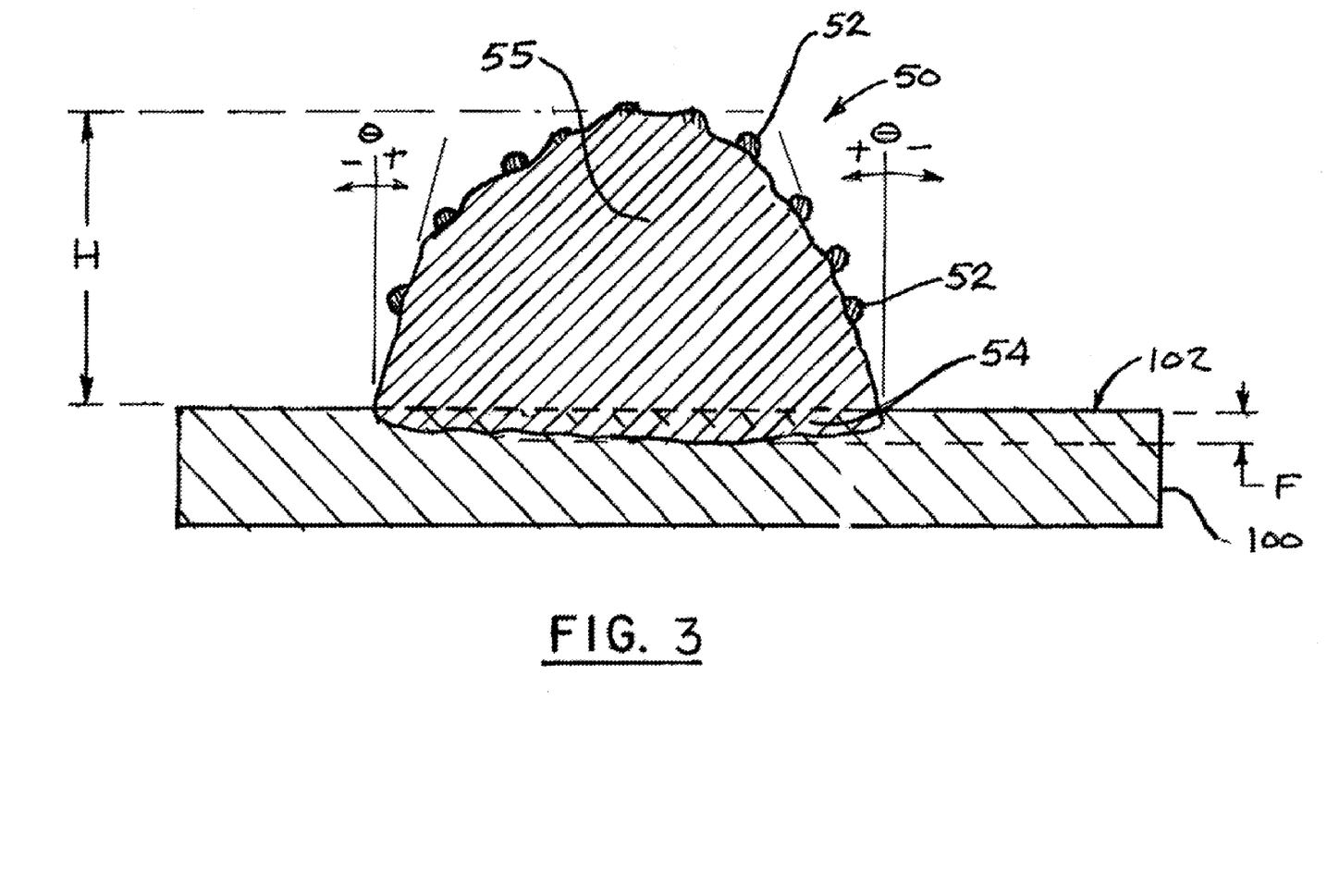
FIG. 3 is an enlarged sectional view of the mid-section of a typical bead-like slip-resisting feature on a substrate formed by the present invention.

Referring now to FIG. 3, shown is a partial sectional view of substrate 12 and a single bead-like feature 50 extending from the surface of the substrate view approximately mid-section on the feature. The raised features 50 are formed on the substrate 12 by the interaction of the energy beam with the substrate and the presence of the powder particles at the impingement point. The feature size and spacing is mainly dependent on the laser power, soot size, beam intermittence (pulse width and duration), powder feed rate, powder type and the laser or substrate travel speed. Variation of these parameters in the present invention provides the capability to control and vary the dimensional configuration of the features to provide the desired slip-resistance on the substrate. For a given impingement spot size and powder type for example, the length of the slip-resistant feature for a pulse width of 20 ms, a pulse length of 60 ms (corresponding to approximately 16 Hz) and a relative speed difference between laser and substrate of 6 inches per second will be approximately 0.120 inch with a space between adjoining features along the direction of travel "X" measuring 0.240 inch. Adjustment of the beam spot size or the use of a different diameter laser fiber allows the width of the feature in a direction normal to the direction of travel "X" to be established and controlled. Ideally, the feature will have a length to width proportion as close as is achievable to one to produce anti-slip features that are not direction-specific, that is the coefficient of friction is generally the same regardless of the direction of movement across the substrate. It is also possible to operate the laser in a continuous mode as the laser traverses the substrate surface such that a linear ridge-like feature is produced.

The approach to feature size control used by the present invention represents an improvement over known methods in which precise control of the relative positioning between laser and substrate and/or precision control of the powder material is necessary to create the desired raised bead-like features. The features can also be created by pre-placing the powder blends on the surface of the substrate 12 and allowing the laser to travel across the surface in its intermittent mode.

In particular, FIG. 3 illustrates the configuration of the feature 50 at the point of connection with substrate 100. Since feature 50 is connected to substrate 100 using a process that takes both the powder and the substrate material into a partially molten state and forms a fusion zone 54 comprising substrate and powder material, there is little tendency for the molten powder to take a drop-like form sitting atop the substrate at the impingement point. Instead, feature 50 forms with the substrate surface 102 a side angle Θ having a positive value as shown in FIG. 3. In contrast, a drop-like form connected to the substrate as would be typical for a lower-power process, such as a plating process, would generally exhibit a side angle Θ influenced by surface tension of the molten powder resulting in a negative value for Θ.

The raised features 50 produced by one embodiment of this process during testing using a 1 micron diameter fiber generally range in height from 0.015 to 0.065 inches, widths from 0.040 to 0.120 inches, and lengths from 0.030 to 0.250 inches. Continuous beads were also produced. Larger features can be produced using larger fibers, up to 1 mm in diameter. The substrate materials including A-36 carbon, HY80 and HY100 alloy steels, and several 3000, 5000 and 6000 series aluminum alloys were tested at typical travel speeds ranging from 240 to 420 inches per minute to achieve the feature size results. Acceptable results have been achieved at travel speeds approaching 800 linear inches per minute. The features were typically formed from alloys of nickel, cobalt, and ferrous-based alloy powders blended with 10%-48% of various oxides, carbides and nitrides, aluminides and ceramics.

The characteristics of the features, in addition to the laser and speed variables mentioned above, depended largely on the types of powders and blends used for the features. For example, materials which are required to meet the minimum OSHA mandated coefficient of friction (COF) of 0.50 to be considered slip resistant were manufactured with features that used only the base alloy powders. To meet higher COF requirements, the type of alloy selected, the additives and their percentages were critical. Of particular importance, was the distribution of the additives 52 within the volume 55 of the feature 50. As a natural function of the freezing process of the feature 50 once the energy beam is removed (cycled off), the insoluble particles of the additive 52 are "suspended" throughout the feature volume 55, including on the surface. Friction testing was performed using the friction testing device described in Navy Performance Specification MIL-PRF-24667B(SH) dated 3 Jun. 2005, Section 4.5.1.2. Depending on the powder blend selected, COF's far exceeding 1.0 were maintained for all materials tested in air and water environments. When tested in aviation oil, the minimum COF for all of the aluminum alloys tested remained in excess of 1.0. For steel samples tested after extensive wear the COF remained above 0.80. Important variables and results are summarized in Table A.

TABLE A

Range of Operating Parameters and Feature Dimensions

| | |
|---|---|
| Radiation Source | YAG, fiber laser or infrared source |
| Laser | 600 W Nd-YAG; 3 KW Fiber |
| Laser Power | 300 W–10,000 W |
| Travel Speed | 240-800 inch/min |
| Powder Feed Rate | 1-20 oz/min |
| Powder Particle Size | 60-300 microns |

TABLE A-continued

Range of Operating Parameters and Feature Dimensions

| | |
|---|---|
| Base Materials | carbon and alloy steels, aluminum, aluminum alloys, nickel, copper and their alloys |
| Powder Materials, Additives | nitride, carbide, boride, silicide, oxide, ceramic, aluminide |
| Powder Materials, Matrix | tungsten, stainless steel, carbon steel, aluminum, titanium, nickel, copper and their alloys or mixtures |
| Position of Powder Delivery Tube | front, back or side |
| Bead Width: | 0.040-0.120 inch |
| Bead Length | 0.030 inch to continuous |
| Bead Height | 0.015-0.065 inch |
| Bead Anchor Portion | 0.003-0.035 inch |
| Coefficient of Friction*, Air | 0.75 to 1.90 |
| Coefficient of Friction in Water* | 0.75 to 1.90 |
| Coefficient of Friction in Oil* | |
| Aluminum Substrate | 0.75-1.4 |
| Steel Substrate | 0.76-1.4 (0.85 after wear tests described in PRF-24667B(SH) Section 4.5.1.1) |

*Measured with apparatus described in Navy Performance Specification MIL-PRF-24667B (SH) dated 3 Jun. 2005, Section 4.5.1.2.

The momentary interaction of beam 14 with substrate material 12 during particle injection combined with the laser power allows significant alloying of the material at the beam impingement point, with characteristics more closely resembling a weld than conventional cladding. The best mode for carrying out the invention uses sufficient laser power to cause a fusion zone, shown as dimension "F" extending into the substrate material ranging from 0.003 to 0.035 inches. The result is that the slip-resistant raised features are less likely to be dislodged from the substrate surface when subject to transverse forces, such as would be experienced when an object is slid across the surface.

Figure 4:
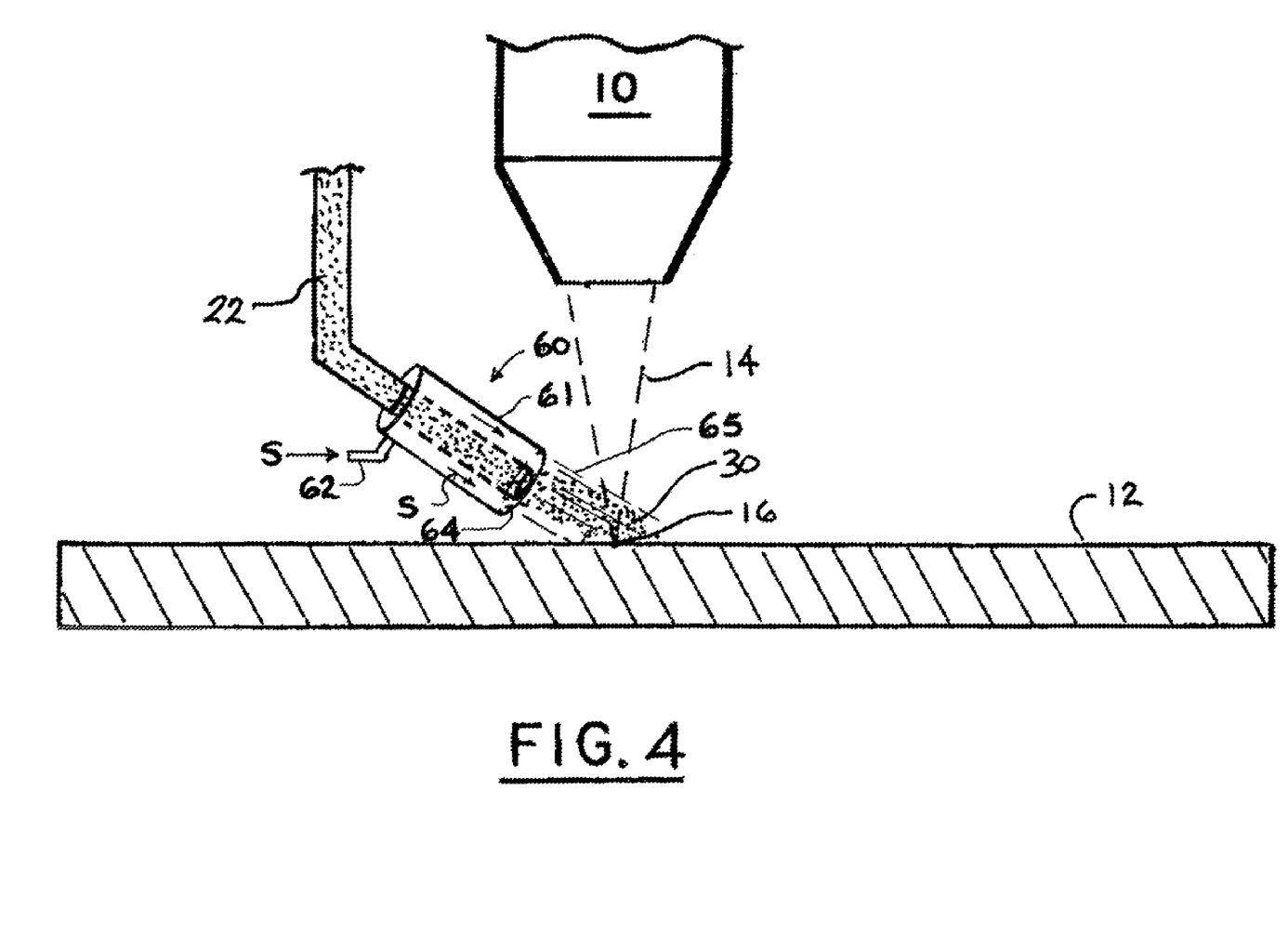
FIG. 4 is a partial enlarged front elevation view of the apparatus shown in FIG. 1, showing an alternate embodiment incorporating a shrouding gas at the impingement point.

Referring now to FIG. 4, an alternate embodiment of the invention is shown incorporating shroud gas supply apparatus 60 into the powder feed system. It is sometimes advantageous, depending on the intended usage of the slip-resistant product and the powders and substrate materials chosen, that a shrouding gas such as argon, nitrogen, or other suitable inerting gas be supplied to the impingement point 16 during the process to reduce potential oxidation of the metals. The use of shroud or shield gas in welding and other similar material fusion processes is well known. Shroud gas supply apparatus 60 includes shroud gas nozzle 61 which is connected to powder feed tube 22 in a manner forming an annular passageway surrounding the outer circumference of the feed tube 22. Shroud gas (shown as "S") is introduced from a source (not shown) through shroud gas inlet port 62 and discharged from annular opening 64 in a direction generally parallel to the flow of powder particles and directed toward the impingement point 16. The flow of shroud gas created a shroud gas zone 65 which envelopes the powder particles and displaces the atmospheric gasses normally present so that the metallurgic reaction at impingement point 16 may occur in an inert atmosphere.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A method for producing a slip-resistant surface on a substrate having a generally planar surface comprising the steps of:
   a) providing a metallic substrate having a generally planar surface;
   b) providing a radiant energy source selectively positionable adjacent to the surface, the energy source emitting a high energy beam and having a focusing device for varying the focal length of the beam, and a control device for managing the beam, the energy beam having an axis and a focal point, the axis aligned to intersect with the surface at an angle and the focal point being generally on the surface at a beam impingement point;
   c) providing a powder supply apparatus having a supply of powder particles, and a powder feed tube with generally opposing first and second ends, the first end connected to the supply, the second end being open and generally directed toward the beam impingement point, the powder feed tube being disposed to convey the powder particles from the supply and discharge the particles generally toward the beam impingement point;
   d) supplying, via the powder supply apparatus, substantially simultaneously with projection of the energy beam, a predetermined flow rate of powder particles generally toward the beam impingement point on the substrate;
   e) intermittently projecting for a pre-selected duration and frequency, an energy beam from the radiant energy source generally toward the surface to the impingement point, the focal length of the energy beam coinciding with the separation between the energy source and the impingement point;
   f) allowing partial melting of the substrate surface material proximate to the impingement point and of the powder particles to form an alloy of the two proximate to the impingement point, the partial melting of the substrate creating a fusion zone extending above and below the surface of the substrate, the fusion zone having a depth below the surface of the substrate; and
   g) allowing additional powder particles to be melted and form a feature extending from the substrate surface and having a height approximately twice that of the fusion zone extending below the surface of the substrate.

2. The method of claim 1, further comprising the steps:
   h) causing relative movement between the radiant energy source and the substrate coordinated with the projection of the energy beam; and
   i) repeating steps e) through g) thereby forming another feature on the substrate and creating a slip-resistant surface on the substrate.

3. The method of claim 2, further comprising the step of selecting the energy beam intermittence projection duration and frequency between consecutive projections of the energy beam to establish the size of the feature on the substrate.

4. The method of claim 3, further comprising the step of synchronizing the protection duration of the energy beam and the interval between consecutive projections of the energy beam with the relative movement between the radiant energy source and the substrate to manage the size and spacing of the features on the substrate.

5. The method of claim 4, wherein the radiant energy source has a power ranging between about 400 watts and about 10,000 watts.

6. The method of claim 5, wherein the radiant energy source is a laser.

7. The method of claim 6, wherein the radiant energy source is a laser having an output wavelength less than or equal to $1.07 \times 10^{-6}$ microns.

8. The method of claim 4, wherein said powder particles comprise a metallic material selected from the group comprising a nitride, carbide, silicide, boride, aluminide, ceramic, and mixtures thereof.

9. The method of claim 8, wherein the powder particles comprise a metallic material selected from the group comprising tungsten, stainless steel, carbon steel, aluminum, titanium, nickel, copper, and mixtures thereof.

10. The method of claim 9, further comprising the steps of:
providing a shroud gas supply apparatus; and
supplying an inerting gas via the shroud gas supply apparatus to the beam impingement point so as to enable the partial melting of the powder and substrate caused by the energy beam to occur in an inert atmosphere.

11. The method of claim 4, wherein the fusion zone depth is at least 0.006 inches.

12. The method of claim 4, wherein the fusion zone depth is within a range of 0.006 and 0.035 inches.

13. The method of claim 4, wherein the radiant energy source has a power of at least about 400 watts.

* * * * *